(12) United States Patent
Liao et al.

(10) Patent No.: US 8,904,301 B2
(45) Date of Patent: Dec. 2, 2014

(54) MOBILE TERMINAL DATA REFRESHING METHOD AND MOBILE TERMINAL

(75) Inventors: Hailiang Liao, Shenzhen (CN); Qihong Fu, Shenzhen (CN); Shizheng Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 137 days.

(21) Appl. No.: 13/642,021

(22) PCT Filed: Jul. 20, 2010

(86) PCT No.: PCT/CN2010/075332
§ 371 (c)(1),
(2), (4) Date: Oct. 18, 2012

(87) PCT Pub. No.: WO2011/130964
PCT Pub. Date: Oct. 27, 2011

(65) Prior Publication Data
US 2013/0042192 A1     Feb. 14, 2013

(30) Foreign Application Priority Data
Apr. 23, 2010  (CN) .......................... 2010 1 0155365

(51) Int. Cl.
*G06F 3/048* (2013.01)
*H04M 1/725* (2006.01)

(52) U.S. Cl.
CPC ...... *H04M 1/72519* (2013.01); *H04M 1/72544* (2013.01)
USPC ........... 715/768; 715/765; 715/779; 715/804; 715/810; 715/864; 345/169

(58) Field of Classification Search
CPC .......... G06F 3/00; G06F 3/048; H04M 1/247; H04M 1/725
USPC ......... 715/744, 764, 765, 768, 779, 781, 788, 715/790, 804, 810, 864, 866; 345/169; 455/566
See application file for complete search history.

(56) References Cited

U.S. PATENT DOCUMENTS

| 7,312,798 B2 * | 12/2007 | Yach et al. ................. 345/589 |
| 8,351,989 B2 * | 1/2013 | Ahn et al. ................... 455/566 |
| 2008/0207188 A1 * | 8/2008 | Ahn et al. ................... 455/418 |

(Continued)

FOREIGN PATENT DOCUMENTS

CN    101163297 A    4/2008

(Continued)

OTHER PUBLICATIONS

Chengen Liu, The State of Intellectual Property Office, The P.R. China, International Search Report, 6 pages, Jan. 20, 2011.

*Primary Examiner* — Xiomar L Bautista
(74) *Attorney, Agent, or Firm* — McGarry Bair PC

(57) ABSTRACT

The present invention discloses a mobile terminal data refreshing method and a mobile terminal. The above method comprises: updating interface image data of a HOME User Interface (HOME UI) and/or a local top bar, synthesizing interface image of the HOME UI and the local top bar into top bar image data with transparency; and displaying the top bar image data in the top bar window of the desktop of the mobile terminal. According to the technical solution provided in the present invention, the local top bar can be easily integrated into the HOME UI to implement translucent display style, and all functions of the top bar of the HOME UI can not be affected.

10 Claims, 5 Drawing Sheets

(56) References Cited

U.S. PATENT DOCUMENTS

2009/0064013 A1    3/2009    Lee et al.
2010/0029338 A1*   2/2010    Kato .......................... 455/566

FOREIGN PATENT DOCUMENTS

| | | |
|---|---|---|
| CN | 101488333 A | 7/2009 |
| CN | 101494678 A | 7/2009 |
| CN | 101606384 A | 12/2009 |
| EP | 1684262 A1 | 7/2006 |
| EP | 1962480 A2 | 8/2008 |
| JP | 201014899 A | 1/2010 |
| JP | 2010014899 A | 1/2010 |
| WO | 2007/105887 A1 | 9/2007 |

* cited by examiner

MOBILE TERMINAL DATA REFRESHING METHOD AND MOBILE TERMINAL

CROSS-REFERENCE TO RELATED APPLICATIONS

This application is a National Phase application of International Application No. PCT/CN2010/075332, filed Jul. 20, 2010, which claims the benefit of Chinese Patent Application No. 201010155365.3, filed Apr. 23, 2010, both of which are incorporated herein by reference in their entirety.

FIELD OF THE INVENTION

The invention relates to communication field, and in particularly to a mobile terminal data refreshing method and a mobile terminal.

BACKGROUND OF THE INVENTION

The HOME User Interface (HOME UI) of terminals (such as mobile phones) refers to the standby interface or the desktop of the terminal. With the UI technology development of mobile phones, the main interfaces of many of conventional high-end mobile phones are no longer the traditional 9 square interfaces, which are replaced by a user interface called as mobile phone HOME UI. This kind of user interface is very flexible in layout, and can realize split-screen display by the dragging of the screen. The HOME UI generally includes some widgets (a kind of icon or UI which can be dragged at will on the interface) and applications such as dynamic picture browsing, dynamic music playing, dynamic video playing and the like. The mobile phone HOME UI not only makes mobile phones full of personality and taste, but also makes the operation of mobile phones become comfortable, simple and free, perfectly reflecting the functions and the characteristics of mobile phones.

The development of the mobile phone HOME UI comprises the design of HOME UI. The top bar of the mobile phone is a very special display interface on the mobile phone, which generally lies at the top of the mobile phone screen, and on which much information can be displayed, such as the signal strength of the mobile phone, the residual capacity of the mobile phone, whether there are messages or not, whether there are missed calls or not, etc.

Since the top bar of the mobile phone is closely correlated with many other modules of the mobile phone, the re-realization of the top bar during the development of the mobile phone HOME UI not only enhances the coupling degree of the HOME UI and other modules of the mobile phone and weakens the independence of the modules, but also greatly increases the development workload. Therefore, in practical applications, the problems above can be avoided by integrating the HOME UI and the local top bar.

However, there are many problems when the local top bar is used directly in the HOME UI of the mobile terminal. For example, it is difficult to control the redrawing and refreshing of the interface of the local top bar; the style of the HOME UI and the local top bar is too different; how to distinguish the event reception of the HOME UI and the local top bar and so on.

SUMMARY OF THE INVENTION

To solve the problem in the related arts that it is difficult to control the redrawing and refreshing of the interface of the local top bar when the local top bar is used directly in the HOME UI of the terminal, the present invention is provided. Therefore, the present invention provides an improved mobile terminal data refreshing method and a mobile terminal to solve at least one of the problems above.

According to one aspect of the present invention, a mobile terminal data refreshing method is provided.

The mobile terminal data refreshing method of the present invention comprises: updating interface image data of a HOME UI and/or interface image data of a local top bar; synthesizing interface image data of the HOME UI and interface image data of the local top bar into top bar image data with transparency; and displaying the top bar image data in the top bar window of the desktop of the mobile terminal.

According to the other aspect of the present invention, a mobile terminal is provided.

The mobile terminal of the present invention comprises: an updating module, configured to update interface image data of a HOME UI and/or interface image data of a local top bar; an interface synthesizing module, configured to synthesize interface image data of the HOME UI and interface image data of the local top bar into top bar image data with transparency; and a displaying output module, configured to display the top bar image data in the top bar window of the desktop of the mobile terminal.

By the present invention, after interface image data of a HOME UI and/or interface image data of a local top bar is updated, interface image data of the HOME UI and interface image data of the local top bar are synthesized as top bar image data with transparency, and then the top bar image data is displayed in the top bar window of the desktop of the mobile terminal. The problem in the related arts that it is difficult to control the redrawing and refreshing of the interface of the top bar when the local top bar is used directly in the HOME UI of the terminal is solved, thus the local top bar can be easily integrated into the HOME UI to implement the translucent display style, and all functions of the top bar of the HOME UI can not be affected.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

It needs to be noted that the embodiments and the features of the embodiments in the present application can be combined with each other under the circumstances that there is no conflict. The present invention is described in detail with reference to the accompanying drawings and in combination with the embodiments hereinafter.

It is difficult to control the redrawing and refreshing of the interface of the local top bar when the local top bar is used directly in the HOME UI of the mobile terminal. According to the embodiments of the present invention, the updated image interface data of a HOME UI module and on a local top bar module can be synthesized to implement the refreshing of the top bar image data.

Figure 1:
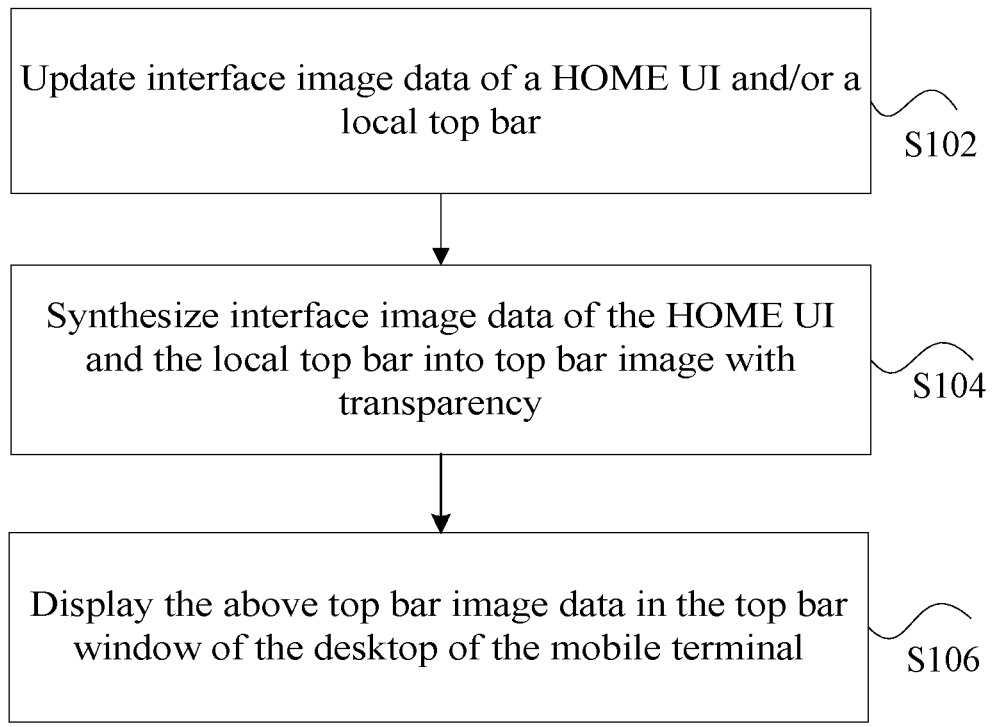
FIG. 1 is a flowchart of the mobile terminal data refreshing method according to the embodiment of the present invention.

FIG. 1 is a flowchart of the mobile terminal data refreshing method according to the embodiment of the present invention. As shown in FIG. 1, the refreshing method of the top bar image data according to the embodiment of the present invention comprises the following steps.

Step S102: interface image data of a HOME UI and/or interface image data of a local top bar is updated;

Step S104: interface image data of the HOME UI and interface image data of the local top bar are synthesized into top bar image data with transparency; and Step S106: the above top bar image data is displayed in the top bar window of the desktop of the mobile terminal.

In the related arts, it is difficult to control the redrawing and the refreshing of the interface of the local top bar when the local top bar is used directly in the HOME UI of the terminal. But adopting the above method, the local top bar can be easily integrated into the HOME UI to implement the translucent display style, and the redrawing and refreshing of the local top bar interface can be realized.

Preferably, before the interface image data of the HOME UI and/or the interface image data of the local top bar is updated, the method may also comprise the following steps of:

(1) receiving an event requesting for updating the interface image data of the HOME UI and/or the interface image data of the local top bar; and (2) initiating updating instructions corresponding to the event.

During the preferred implementation, the redrawing of both the top bar area of the HOME UI and the interface of the local top bar can activate a top bar refreshing management module to redraw the top bar area. Thus, the method above can be applied in many scenarios. The above-mentioned preferred implementation of the process that the HOME UI module initiates the updating instructions is hereinafter illustrated in conjunction with FIG. 2. The above-mentioned preferred implementation of the process that the local top bar module initiates the updating instructions is hereinafter illustrated in conjunction with FIG. 3.

The following two embodiments are implemented on the Arena platform, and these embodiments can also be implemented on other platforms if there are no conflicts.

Figure 2:
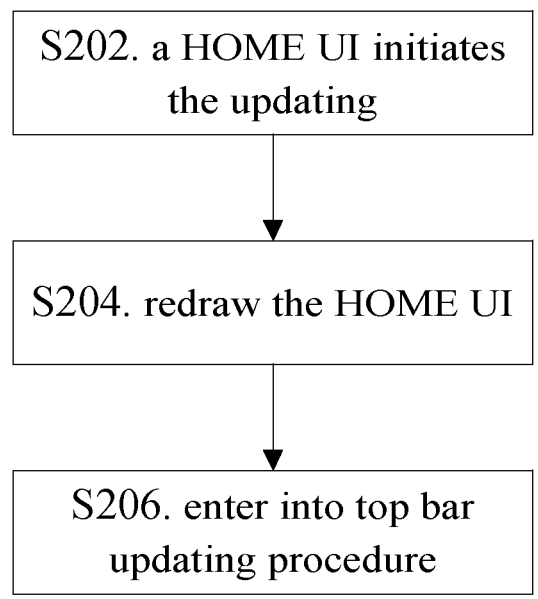
FIG. 2 is a flowchart of interface updating of the HOME UI according to the embodiment of the present invention.

FIG. 2 is a flowchart of interface updating of the HOME UI according to the embodiment of the present invention. The process of interface updating of the HOME UI may comprise the following steps.

Step S202: a HOME UI module initiates an updating instruction;

Step S204: the HOME UI module writes the redrew (updated) interface image data into the frame buffer of the HOME UI; and Step S206: entering into a refreshing procedure of the top bar.

Figure 3:
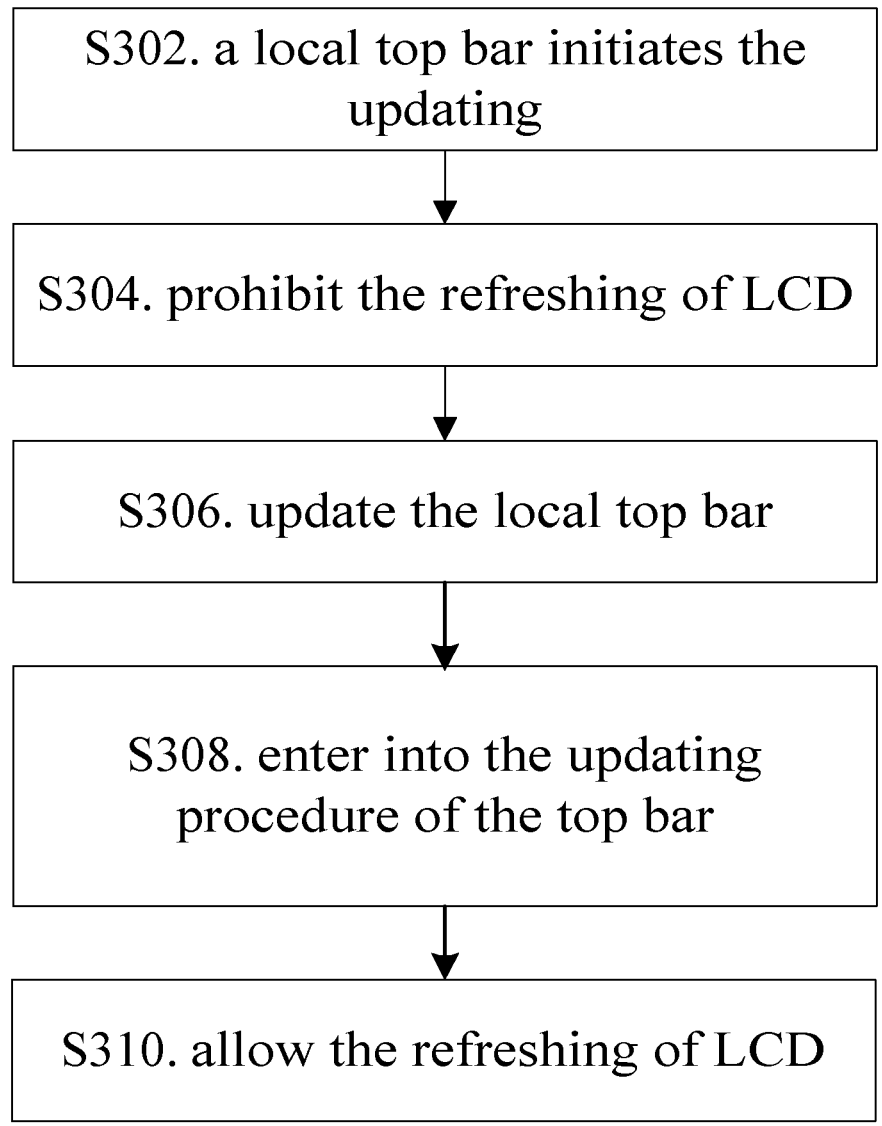
FIG. 3 is a flowchart of interface updating of the local top bar according to the embodiment of the present invention.

FIG. 3 is a flowchart of interface updating of the local top bar according to the embodiment of the present invention. The process of interface updating of the local top bar comprises the following steps.

Step S302: a local top bar initiates an updating instruction;

Step S304: the refreshing of LCD is prohibited, and a function dd_lcd_disable_refresh( ) is called;

Step S306: the local top bar is updated, and the redrew interface image data of the local top bar is saved to the frame buffer of GUI;

Step S308: entering into the refreshing procedure of the top bar; and

Step S310: the refreshing of the top bar is finished, and then the refreshing of LCD is allowed and a function dd_lcd_enable_refresh( ) is called.

In the above steps, the functions dd_lcd_enable_refresh( ) and dd_lcd_disable_refresh( ) are two interfaces of the LCD driver module in Arena platform, which are used for controlling whether the screen refreshing is allowed. Since the refreshing of the local top bar is directly written into the frame buffer of GUI, if the screen refreshing is not prohibited, the refreshed interface of the local top bar will be displayed on the screen, causing the screens to flicker.

Preferably, the step of updating the interface image data of the HOME UI may further comprise: storing the updated interface image data of the HOME UI in a first frame buffer; the step of updating the interface image data of the local top bar may further comprise: storing the updated interface image data of the local top bar in a second frame buffer.

In the preferred implementation, three cache modules may be configured: Cache Module 1 (equivalent to the first frame buffer), Cache Module 2 (equivalent to the second frame buffer) and Cache Module 3 (equivalent to a third frame buffer), which are configured to save the updated interface image data of the HOME UI, the refreshed interface image data of the local top bar and the synthesized translucent interface image data of the top bar respectively.

Preferably, the step of synthesizing the interface image data of the HOME UI and the local top bar into the top bar image data with transparency may comprise the following steps of:

(1) obtaining the latest interface image data from the first frame buffer and the second frame buffer;

(2) synthesizing the obtained interface image data according to the predetermined transparency value to generate the top bar image data with transparency.

Preferably, the step of synthesizing the interface image data of the HOME UI and the interface image data of the local top bar into the top bar image data with transparency may comprise: saving the synthesized interface image data of the top bar in the third frame buffer.

Figure 4:
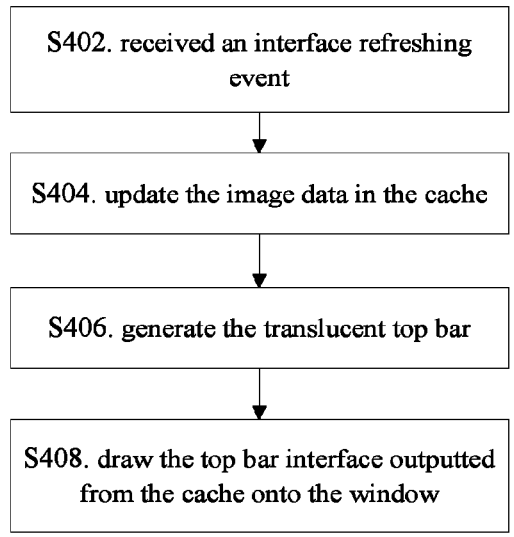
FIG. 4 is a flowchart of the mobile terminal data refreshing method according to the preferred embodiment 1 of the present invention.

FIG. 4 is a flowchart of the mobile terminal data refreshing method according to the preferred embodiment 1 of the present invention. In the preferred implementation, a top bar refreshing management module may be set in the mobile terminal, which is configured to execute the refreshing operation of the top bar image data by invoking the modules included in thereof. When the top bar area of the HOME UI or the local top bar is redrew, the refreshing procedure of the top bar will start, wherein the top bar refreshing management module is configured to refresh the image data of the top bar area. The refreshing process above mainly comprises the following steps.

Step S402: when an interface refreshing event is received by the HOME UI module and/or the local top bar module, the refreshing procedure of the top bar is started;

Step S404: the top bar refreshing management module updates the image data of the HOME UI in cache or the image data of the local top bar by invoking the interface storage module;

Step S406: the top bar refreshing management module generates the translucent top bar by invoking the interface synthesizing module, and saves it in output cache; and Step S408: the top bar refreshing management module draws the top bar interface outputted from the cache onto the window by invoking the displaying output module.

In this embodiment, after interface image data of a HOME UI and/or interface image data of a local top bar is updated, interface image data of the HOME UI and interface image data of the local top bar are synthesized as top bar image data with transparency, and then the top bar image data is displayed in the top bar window of the desktop of the mobile terminal. The problem in the related arts that it is difficult to control the redrawing and refreshing of the interface of the top bar when the local top bar is used directly in the HOME UI of the terminal is solved, thus the local top bar can be easily integrated into the HOME UI to implement the translucent display style, and all functions of the top bar of the HOME UI can not be affected.

Figure 5:
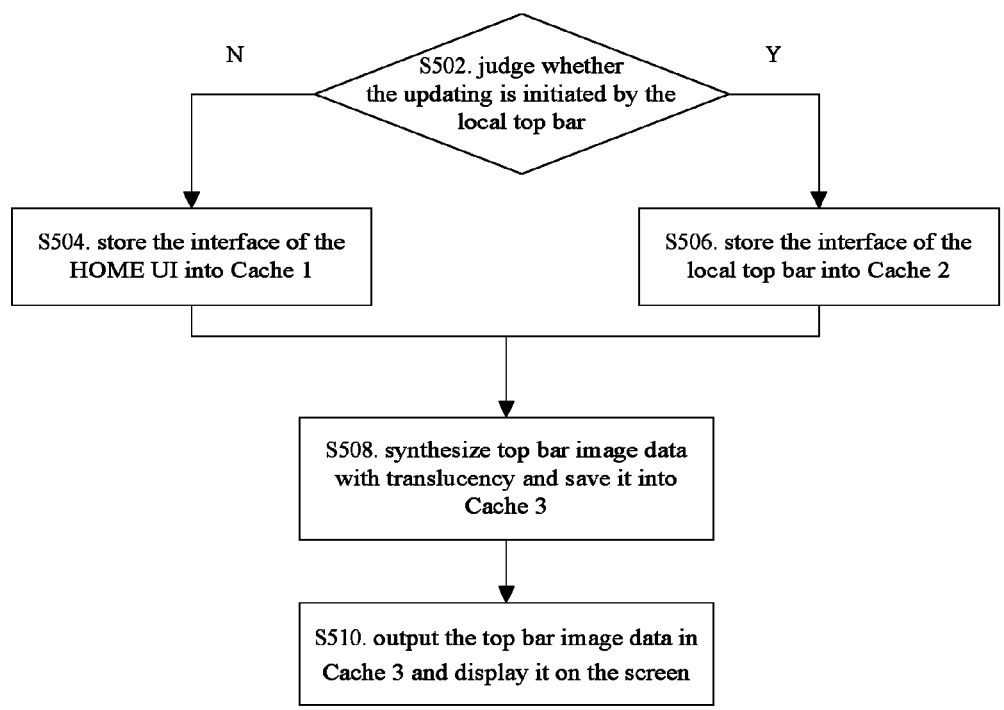
FIG. 5 is a flowchart of the mobile terminal data refreshing method according to the preferred embodiment 2 of the present invention.

FIG. 5 is a flowchart of the mobile terminal data refreshing method according to the preferred embodiment 2 of the present invention. The refreshing process of the top bar image data mainly comprises the following steps.

Step S502: whether the updating is initiated by the local top bar or the HOME UI is judged, wherein if the updating is initiated by the HOME UI, it will go to Step S504, otherwise, it will go to Step S506;

Step S504: the interface storage module saves the image data of the top bar area in the frame buffer of the HOME UI into Cache Module 1 (i.e. the first frame buffer), and then it goes to step S508;

Step S506: the interface storage module saves the image data of the local top bar window in the frame buffer of GUI into Cache Module 2 (i.e. the second frame buffer), and then it goes to step S508;

Step S508: the interface synthesizing module synthesizes the data in Cache Module 1 and Cache Module 2 into top bar image data with translucency according to a certain a value (the transparency of the top bar in the HOME UI), and then the top bar image data is saved into Cache Module 3 (i.e. the third frame buffer); and Step S510: the displaying output module copies the top bar image data in Cache Module 3 to the GUI frame buffer corresponding to the local top bar window, to replace the original interface of the local top bar window.

Preferably, the implementation of Step S506 on the Arena platform may further comprise:

(1) obtaining the handle 'hdc' of the local top bar window;

(2) obtaining the window interface bitmap from the local top bar window by using a function GetBitmapFromDC( );

(3) saving the interface image data in the bitmap into Cache Module 2.

In this embodiment, after interface image data of a HOME UI and/or interface image data of a local top bar is updated, interface image data of the HOME UI and interface image data of the local top bar are synthesized as top bar image data with transparency, and then the top bar image data is displayed in the top bar window of the desktop of the mobile terminal. The problem in the related arts that it is difficult to control the redrawing and refreshing of the interface of the top bar when the local top bar is used directly in the HOME UI of the terminal is solved, thus the local top bar can be easily integrated into the HOME UI to implement the translucent display style, and all functions of the top bar of the HOME UI can not be affected.

Figure 6:
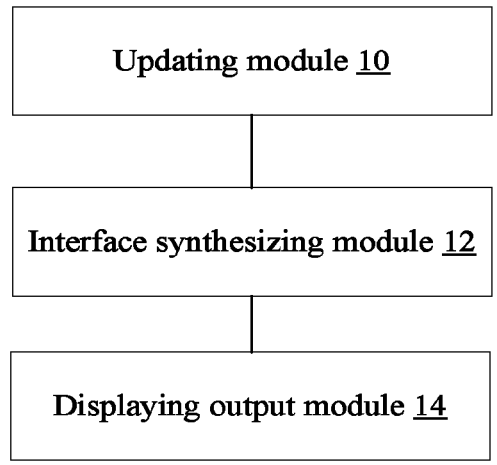
FIG. 6 is a structure block diagram of the mobile terminal according to the embodiment of the present invention.

FIG. 6 is a structure block diagram of the mobile terminal according to the embodiment of the present invention. The mobile terminal comprises: an updating module 10, an interface synthesizing module 12 and a displaying output module 14, wherein the updating module 10 is configured to update interface image data of a HOME UI and/or interface image data of a local top bar;

the interface synthesizing module 12 is configured to synthesize interface image data of the HOME UI and interface image data of the local top bar into top bar image data with transparency; and the display output module 14 is configured to display the top bar image data in the top bar window of the desktop of the mobile terminal.

The combination of modules in the mobile terminal above can realize that the local top bar is integrated into the HOME UI easily, so as to implement translucent display style, and can realize the redrawing and refreshing of the top bar interface.

Figure 7:
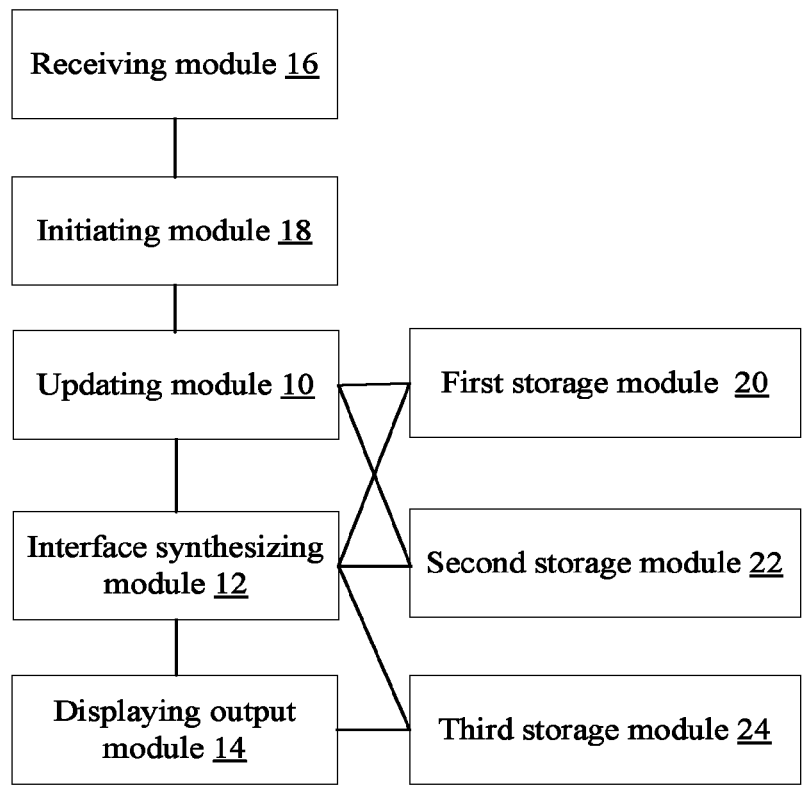
FIG. 7 is a structure block diagram of the mobile terminal according to the preferred embodiment of the present invention.

Preferably, as shown in FIG. 7, the mobile terminal above may also comprise: a receiving module 16, configured to receive an event requesting for refreshing the interface of the HOME UI and/or the interface of the local top bar; and an initiating module 18, configured to initiate updating instructions corresponding to the event when receiving the event.

Preferably, as shown in FIG. 7, the mobile terminal above may also comprise: a first storage module 20 and a second storage module 22, wherein the first storage module 20 is configured to store the updated interface image data of the HOME UI; and the second storage module 22 is configured to store the updated interface image data of the local top bar.

Preferably, as shown in FIG. 7, the mobile terminal above may also comprise: a third storage module 24, configured to store the synthesized top bar image data; and the display output module 14 is also configured to output the data in the third storage module, and to display the outputted data in the top bar window of the desktop of the mobile terminal.

In the preferred implementation, three storage modules may be adopted respectively: the first storage module 20, the second storage module 22 and the third storage module 24, which are configured to save the updated interface image data of the HOME UI, the refreshed interface image data of the local top bar and the synthesized translucent interface image data of the top bar respectively. By adopting the three storage modules above, the refreshing solution of the above-mentioned top bar image data can be realized easily.

Figure 8:
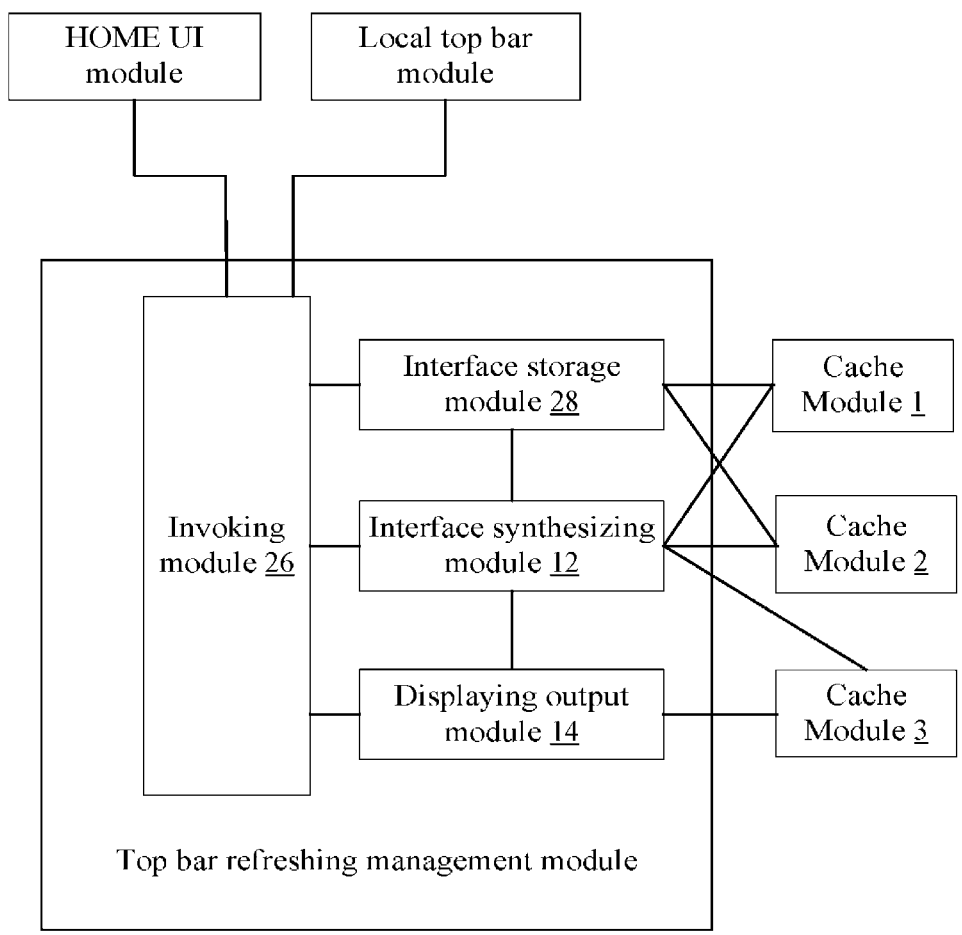
FIG. 8 is a structure schematic diagram of the mobile terminal according to the embodiment of the present invention.

FIG. 8 is a structure schematic diagram of the mobile terminal according to the embodiment of the present invention. The mobile terminal comprises a top bar refreshing management module, wherein the top bar refreshing management module may further comprise the following modules of: an invoking module 26, an interface storage module 28 (equivalent to the updating module above), an interface synthesizing module 12 and a displaying output module 14.

In the above mobile terminal, the invoking module 26 in the top bar refreshing management module is configured to invoke the interface storage module 28, and the interface synthesizing module 12 and the displaying output module 14 execute the updating of the top bar display area. The data storage adopts three caches: Cache Module 1 (equivalent to the first frame buffer), configured to save the updated interface image data of the HOME UI; Cache Module 2 (equivalent to the second frame buffer), configured to store the refreshed interface image data of the local top bar; and Cache Module 3 (equivalent to the third frame buffer), configured to save the synthesized translucent interface image data of the top bar.

In the preferred implementation, when the top bar area of the interface of the HOME UI is redrew or the interface of the local top bar is redrew (updated), it will be activated that the top bar refreshing management module redraws the top bar area, which can be detailed with reference to FIG. 2 and FIG. 3.

To sum up, according to the above-mentioned embodiments of the present invention, the mobile terminal data refreshing method and the mobile terminal provided can preferably realize that the local top bar is integrated into the HOME UI, and make the local top bar be translucently displayed in the HOME UI, which neither covers the contents of the HOME UI, nor generates too great difference from the style of HOME UI; meanwhile, the top bar of the HOME UI can also receive events normally, and the function of the top bar is not affected.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall cover any modification, equivalent substitution and improvement within the principle of the present invention.

What is claimed is:

1. A mobile terminal data refreshing method, comprising:
   updating interface image data of a HOME User Interface (HOME UI) and/or interface image data of a local top bar;
      synthesizing interface image data of the HOME UI and interface image data of the local top bar into top bar image data with transparency; and
   displaying the top bar image data in a top bar window of a desktop of the mobile terminal.

2. The method according to claim 1, wherein before the step of updating the interface image data of the HOME UI and/or the interface image data of the local top bar, the method further comprises:
   receiving an event requesting for updating the interface image data of the HOME UI and/or the interface image data of the local top bar; and
   initiating updating instructions corresponding to the event.

3. The method according to claim 2, wherein before the step of updating the interface image data of the local top bar, the method further comprises: prohibiting an refreshing operation of Liquid Crystal Display (LCD); and
   after the step of displaying the top bar image data in the top bar window, the method further comprises: relieving the prohibition of the refreshing operation of the LCD.

4. The method according to claim 1, wherein the step of updating the interface image data of the HOME UI comprises:
   storing the updated interface image data of the HOME UI in a first frame buffer; and
   the step of updating the interface image data of the local top bar comprises:
   storing the updated interface image data of the local top bar in a second frame buffer.

5. The method according to claim 4, wherein the step of synthesizing the interface image data of the HOME UI and the interface image data of the local top bar into the top bar image data with transparency comprises:
   obtaining the latest interface image data from the first frame buffer and the second frame buffer; and
   synthesizing the obtained interface image data according to a predetermined transparency value to generate the top bar image data with transparency.

6. The method according to claim 1, wherein the step of synthesizing the interface image data of the HOME UI and the interface image data of the local top bar into the top bar image data with transparency comprises:
   saving the synthesized top bar image data in a third frame buffer.

7. A mobile terminal, comprising:
   an updating module, configured to update interface image data of a HOME User Interface (HOME UI) and/or interface image data of a local top bar;
   an interface synthesizing module, configured to synthesize interface image data of the HOME UI and interface image data of the local top bar into top bar image data with transparency; and
   a displaying output module, configured to display the top bar image data in a top bar window of a desktop of the mobile terminal.

8. The mobile terminal according to claim 7, wherein the mobile terminal further comprises:
   a receiving module, configured to receive an event requesting for refreshing the interface of the HOME UI and/or the interface of the local top bar; and
   an initiating module, configured to initiate updating instructions corresponding to the event when receiving the event.

9. The mobile terminal according to claim 7, wherein the mobile terminal further comprises:
   a first storage module, configured to store the updated interface image data of the HOME UI; and
   a second storage module, configured to store the updated interface image data of the local top bar.

10. The mobile terminal according to claim 7, wherein the mobile terminal further comprises: a third storage module, configured to store the synthesized top bar image data; and
   the displaying output module is configured to output the data in the third storage module, and to display the outputted data in the top bar window of the desktop of the mobile terminal.

* * * * *